United States Patent
Broughton, Jr. et al.

(10) Patent No.: US 9,840,792 B2
(45) Date of Patent: Dec. 12, 2017

(54) MINIMAL WEIGHT COMPOSITES USING OPEN STRUCTURE

(71) Applicant: AUBURN UNIVERSITY, Auburn, AL (US)

(72) Inventors: Roy M. Broughton, Jr., Opelika, AL (US); David J. Branscomb, Sheffield, AL (US); David G. Beale, Auburn, AL (US)

(73) Assignee: Auburn University, Auburn, AL (US)

( * ) Notice: Subject to any disclaimer, the term of this patent is extended or adjusted under 35 U.S.C. 154(b) by 608 days.

(21) Appl. No.: 14/512,848

(22) Filed: Oct. 13, 2014

(65) Prior Publication Data

US 2015/0056449 A1  Feb. 26, 2015

Related U.S. Application Data

(63) Continuation of application No. 13/864,127, filed on Apr. 16, 2013, now Pat. No. 8,859,088.

(60) Provisional application No. 61/624,528, filed on Apr. 16, 2012.

(51) Int. Cl.

| | |
|---|---|
| *D02G 3/38* | (2006.01) |
| *E04C 3/28* | (2006.01) |
| *B29C 70/50* | (2006.01) |
| *D02G 3/40* | (2006.01) |
| *D04C 1/06* | (2006.01) |
| *D04C 1/02* | (2006.01) |
| *B29K 63/00* | (2006.01) |
| *B29K 307/04* | (2006.01) |

(52) U.S. Cl.
CPC .............. *D02G 3/385* (2013.01); *B29C 70/50* (2013.01); *D02G 3/404* (2013.01); *D04C 1/02* (2013.01); *D04C 1/06* (2013.01); *E04C 3/28* (2013.01); *B29K 2063/00* (2013.01); *B29K 2307/04* (2013.01); *D10B 2505/02* (2013.01); *Y10T 29/49616* (2015.01); *Y10T 428/249921* (2015.04); *Y10T 428/249922* (2015.04); *Y10T 428/2935* (2015.01)

(58) Field of Classification Search
CPC .......... D02G 3/385; D02G 3/404; D04C 1/02; D04C 1/06; D10B 2505/02; E04C 3/28; B29C 70/50; B29K 2307/04; B29K 2063/00; Y10T 428/2935; Y10T 428/249921; Y10T 29/49616
See application file for complete search history.

(56) References Cited

U.S. PATENT DOCUMENTS

| | | | | |
|---|---|---|---|---|
| 3,304,867 A * | 2/1967 | Nadel | ................ | F42B 5/16 102/282 |
| 3,551,237 A * | 12/1970 | Cox | ................ | B29C 53/564 156/155 |
| 4,086,378 A * | 4/1978 | Kam | ................ | B29C 70/22 156/180 |
| 4,137,354 A * | 1/1979 | Mayes, Jr. | ............ | B29C 53/564 156/175 |

(Continued)

*Primary Examiner* — Jeanette E Chapman
(74) *Attorney, Agent, or Firm* — Tuggle Duggins P.A.; Blake Hurt (57) ABSTRACT

Preforms for open structured (lattice) composite tubular members manufactured from large (i.e. high filament count) prepreg yarns on a conventional maypole braiding machine, and subsequently cured to produce fiber reinforced composites of high strength and light weight.

20 Claims, 9 Drawing Sheets

(56) References Cited

U.S. PATENT DOCUMENTS

| | | | | |
|---|---|---|---|---|
| 4,278,485 A * | 7/1981 | Hamm | B29C 70/86 156/173 |
| 4,366,658 A * | 1/1983 | Maistre | B29C 70/24 242/118.1 |
| 4,781,223 A * | 11/1988 | McAliley | D03D 15/00 139/420 R |
| 5,372,868 A * | 12/1994 | Prewo | E04C 2/34 428/120 |
| 5,662,855 A * | 9/1997 | Liew | D04H 18/02 156/184 |
| 5,899,134 A * | 5/1999 | Klein | D04C 1/02 87/13 |
| 5,921,048 A * | 7/1999 | Francom | E04C 3/08 242/437.3 |
| 6,013,341 A * | 1/2000 | Medvedev | E04B 1/36 428/114 |
| 6,260,807 B1 | 7/2001 | Hoyt et al. | 244/158.2 |
| 6,286,788 B1 * | 9/2001 | Hoyt | B64G 1/641 244/158.2 |
| 6,386,484 B1 * | 5/2002 | Hoyt | B64G 1/648 244/158.2 |
| 6,731,497 B2 | 5/2004 | Yokouchi et al. | 361/525 |
| 6,740,381 B2 | 5/2004 | Day et al. | 428/56 |
| 7,132,027 B2 * | 11/2006 | Jensen | B29C 53/564 156/148 |
| 2004/0247866 A1 * | 12/2004 | Jensen | B29C 53/564 428/364 |
| 2005/0115186 A1 * | 6/2005 | Jensen | A45F 3/04 52/633 |
| 2007/0069075 A1 * | 3/2007 | Rosenberger | B32B 3/263 244/123.1 |
| 2009/0155522 A1 * | 6/2009 | Raghavendran | B32B 5/12 428/113 |
| 2009/0193961 A1 * | 8/2009 | Jensen | B29C 53/564 87/8 |
| 2010/0035017 A1 * | 2/2010 | Green | B29C 47/0014 428/114 |
| 2010/0323181 A1 | 12/2010 | Nutt et al. | 428/221 |
| 2016/0201234 A1 | 7/2016 | Khokar | D03C 9/02 139/384 R |

* cited by examiner

MINIMAL WEIGHT COMPOSITES USING OPEN STRUCTURE

CROSS-REFERENCE TO RELATED APPLICATION

This is a continuation of and claims benefits under prior application Ser. No. 13/864,127 filed 16 Apr. 2013, entitled "Minimal Weight Composites Using Open Structure" now U.S. Pat. No. 8,859,088 issued 14 Oct. 2014 which is a non-provisional patent application of U.S. provisional patent application Ser. No. 61/624,528 filed 16 Apr. 2012, entitled "Minimal Weight Braided Composite Using An Open Architecture", in the United States Patent and Trademark Office, each of which are incorporated by reference in their entirety herein.

The present application claims priority to U.S. provisional application No. 61/624,528, filed on Apr. 16, 2012, and hereby incorporates the subject matter of the provisional application in its entirety.

FIELD OF THE INVENTION

The field of the invention is fiber reinforced composites having an open-truss of lattice structure and methods for their manufacture.

BRIEF DESCRIPTION OF THE RELATED ART

Until recently, structures such as frames, trusses, struts, shafts, bridges, etc. were constructed from an assemblage of standard metal elements, mass-produced and commercially available lengths and cross-sectional geometries. The geometries included plates, sheets, angles, channel sections, I-beam shapes, and hollow, circular, square and rectangular tubing (Manual of Steel Construction, 8th Edition, American Institute of Steel Construction, 1987), and are commonly made from steel or aluminum. It is well known that truss structures provide high strength and stiffness while minimizing weight. Metal truss structures are composed of large apex members or beams connected along the length of the beams with smaller connecting elements that are welded or bolted between the beams. The connecting elements are often placed in an X or W configuration along the beams. The advent of high strength fibers has ushered in a new approach to the creation of light weight and strong structural elements.

When producing composite trusses, welding of the connecting elements is not possible, and bolting is not the most desirable joining method for composite materials because of stress concentrations at the bolt holes, which may lead to failure.

In composite materials, a reinforcement material is distributed in a second bonding material called the matrix. The application considered here is concerned with the polymer matrix composites (PMC), where the reinforcement materials are fibers of high strength, and the matrix is a thermosetting or thermoplastic polymer. Most often, the reinforcing fibers comprise one or more of the available high performance fibers such as graphitic carbon, glass, para-aramid (such as Kevlar™), LCP (such as Vectran™) and others. PMC's are known to offer strength and weight advantages over aluminum and steel, but in order to achieve these advantages the structure and elements in the assemblage of the structure must account for the non-isotropic properties and directionality of composite strength. That is, composites achieve their strength if the largest loads and stresses can be directed along the direction of the fibers.

Despite these differences in materials, and the difficulties of qualifying new materials, there is a need for composite truss structures to minimize the weight of construction elements, since a well-designed composite typically offers equivalent strength at weight savings of 20 to 60% over equivalent metal structures. The question then becomes: how to manufacture a composite truss or other open structure composite structure without the need for bolted joints within the truss.

Braiding is a method of forming a seamless "fabric" tube and is often used to form shapes useful as composite structures after resin impregnation and curing. Braided sleeves have a unique ability to form polygons, flat plates, angle brackets, I beams, and indeed—any closed geometry having uniform or even variable dimensions along the length. This sort of shape variation accompanied by resin impregnation or resin infusion and curing to stiffen the resin, makes braiding an ideal method for construction of composite reinforcement.

As mentioned above, a truss structure is the most efficient for strength and stiffness at low weight. The question is can the braided seamless tube be constructed approximating the beams and open lattice support structure that comprise a truss. That idea is the subject of this invention. Of course, to be practical, it is necessary that the structure should be efficiently manufactured, preferably on simple machinery already in use. One objective of this invention is to produce a fiber reinforced open structured truss preform on a conventional maypole braider.

Infusion of large structural elements with resin is difficult, especially when the large structural elements are immediately adjacent to open spaces in a truss structure. Since the beams and cross members of a truss are large, an array of small yarns or tows have been preimpregnated with resin and arranged in a jacketed parallel bundle to make a large diameter (i.e. high filament number) yarn structure. An assembly of small yarns or tows to produce large prepreg yarns is the subject of a patent application based on preliminary patent application 61/624,534, filed Apr. 16, 2012, the subject matter of which the present application incorporates by reference in its entirety.

DESCRIPTION OF THE PRIOR ART AND OBJECTIVES OF THE INVENTION

The utility of truss structures is well known, so it is natural that people working in composite structures have attempted to manufacture composite trusses. The fragility of joints in composite structures (if they are made by metal joining procedures) is likewise well known. It is natural that there have been numerous attempts to manufacture a composite truss which does not rely on metallic joining techniques.

Some of the earliest and indeed the latest attempts have been by the filament winding process (U.S. Pat. Nos. 3,551, 237, 4,278,485, 6,050,315, 6,290,799, and 8,313,600). Mostly the efforts in filament wound lattice trusses involve a grooved mandrel to accept and align the helical winding of a flat prepreg tape yarn, although one could envision a yarn winding procedure which infused the resin after winding. The most recent, the Geostrut™, is a tubular lattice structure with fiber tows wound helically and longitudinally and that wrap as multilayers over one another at nodes where they intersect. The tows are laid into rigid channels in a rigid mold (Wilson, Kipp and Ridges, U.S. Pat. No. 8,313,600: Method and system for forming composite geometric support structures, Nov. 12, 2012; http://www.geostrut.net/home/) Perhaps the main difficulty of such structures is that the intersections of tapes thickens the nodes and incorporates voids as the tape transitions from the thick joint to the thinner truss member. These voids create points of incipient delamination of the resin infused tape. The previous art has attempted to minimize the thickness and voids at the joints by offsetting successive wrapping layers to either side of the joint (U.S. Pat. No. 4,137,354, and U.S. Pat. No. 8,313,600—FIGS. 8 and 9).

The other major effort at constructing a composite truss is that described in patent literature is one which creates an elegant truss structure which can be produced only by hand (U.S. Pat. No. 5,921,048) or by a slow complicated mechanical device revealed in U.S. Pat. No. 7,132,027, and patent applications 2009/0193961, 20050115186 and 20040247866. The IsoTruss is a lattice tubular structure with fiber tows wound helically, counter-helically and longitudinally and that intersect at nodes held by a support frame with engagement members, in association with an advanced form of a 3-D braiding machine. (Jensen, U.S. Pat. No. 7,132,027, Nov. 7, 2006; Jensen, M. J., Jensen, D. W., Howcroft, A. D., Continuous Manufacturing of Cylindrical Composite Lattice Structures, TEXCOMP10 Recent Advances in Textile Composites, edited by Christophe Binetruy, François Boussu, 2010, p. 80-87).

The Hoyt tether is a lattice structure for a space tether application with fiber yarns that intersect at nodes, and manufactured on a lace braider. Multiple primary load-bearing lines and normally slack secondary lines are connected together with knotless, slipless interconnections (Hoytether: Failure resistant multiline tether U.S. Pat. No. 6,386,484). The lace braiding machine as it currently exists is not suitable for braiding the large yarn assemblies that are needed to make the trusses of this invention.

The strength of composite lattice under compressive loading has received significant attention from government agencies like NASA that find the idea of a composite truss appealing. (Compressive Strength of Composite Lattice Structures, An Hou, Kurt Gramoll, Journal of Reinforced Plastics and Composites March 1998 17:462-483, Fabrication and compressive strength of the composite attachment fitting for launch vehicles. AN HOU. GRAMOLL K. J of Advanced Materials, 2000, vol. 32, not, pp. 39-45.)

SUMMARY OF THE INVENTION

This invention creates an open structure composite member on a conventional maypole braiding machine. The open structure composite member has a higher strength and stiffness to weight ratio than composite structures made from resin infused fabric or from solid filament wound composites, or from other typical construction materials like metal. The invention uses large (i.e. high filament number) prepreg yarns which may be derived from the copending patent application, above. These yarns are jacketed yarns with a core assembly of prepreg tows, having upwards of 20,000 filaments and a jacket of braided or wrapped yarns, or a jacket of extruded polymer. These yarns may be used as both axial and helical yarns on a standard maypole braiding machine although axials and helicals are not necessarily the same size. The carrier positions on the maypole braider often are not completely filled by yarn bobbins, but it is generally preferable that the helical yarns be placed symmetrically on the machine and in the structure. Axial yarns may be placed in a manner that provides the most support where it is needed for the load being applied. For ease of maintaining the yarn locations in the final structure, a mandrel is often used with the yarns being pulled tightly to the mandrel surface by the action of the braiding machine and tension of the yarn created by a braiding machine tension system (not shown). The cross section of the mandrel may be circular, elliptical, polygonal, or of varying shape and diameter. Two speeds, the braiding speed and the mandrel travel speed, are controlled to produce an open structure of yarns on the mandrel, with the yarn placement on the carriers and the two speeds being adjusted to produce the desired variable opening sizes in the open structure member, for example a truss. The mandrel with its prepreg yarn in place is then heated to cure and stiffen the resin and produce a fiber reinforced composite. During curing, either resin is exuded from the prepreg yarn or the melting of the thermoplastic jacket causes bonding at the intersections of the various yarns in the composite structure. The strength of the joints between intersecting yarns in the open structure member may be increased by:

1. Addition of resin at the joint,
2. Lacing of prepreg yarns around the joints and across the center of the formed member, for example a truss,
3. Inclusion of a braided or woven composite sleeve inside, outside or on both sides of the members created during braiding, and
4. Filling or partially filling the spaces between the large jacketed yarns with smaller yarns, which occupy some or all of the carrier positions that were not used for manufacturing the large open structure members. The small yarns may either be prepreg yarns or they may be yarns which are resin infused after braiding and prior to curing. This resin infusion may be by hand, spray or vacuum infusion within a bag.

The objectives realized by this invention are:
1. Use of conventional technology and equipment for manufacture of open composite lattice trusses,
2. Avoidance of mechanical attachment hardware within the strut or truss,
3. Production of structure without the surface irregularity of the IsoTruss™ geometry,
4. Production of truss structure with adequate joint strength at element intersections,
5. Use of a simple mandrel that does not require extensive machining or a complicated removal mechanism,
6. Formation of a structure with significant weight advantage over metal or solid (not open) composite structures, and
7. Formation of an open structured composite truss that is scalable depending on the number and size of carriers and bobbins on a particular braiding machine.

The advantages of the currently described invention include: that it is made by a simple process on a conventional Maypole braiding machine. The manufacturing process is fast (greater than 1 m per minute). It may be produced on a mandrel that is an elongate polygon or cylindrical. Removal of the mandrel after curing is much easier than from the grooved mandrel of the prior art. One can even envision an inflatable mandrel which could be removed by simple deflation and pulling the deflated member out the end or through one of the openings in the truss.

BRIEF DESCRIPTION OF FIGURES

Figure:
FIG. 1. Drawing of a maypole braiding machine,
FIG. 2. Side view of open structure member with circular cross section and z direction interlaced strengthened joints, FIG. 3. Cross section of open structure member with circular cross section and z direction interlaced strengthened joints, FIG. 4. Elevated end view of an open structure member having a true triaxial braid structure, FIG. 5. Open structure member produced having a true triaxial braid structure, FIG. 6. 3-D space frame used for human powered vehicle, "moonbuggy", Multiple open structure members assembled into a much larger truss structure, FIG. 7. Triangular and hexagonal cross section truss and triangular truss members in perspective view—produced by strategic placement of axial yarns, possibly on a triangular or hexagonal mandrel, FIG. 8. Formation zone of open structured member on a maypole braiding machine, and FIG. 9. Open structured member with small yarn stabilization of joints in side view and enlarged side view.

DETAILED DESCRIPTION OF THE PREFERRED EMBODIMENT AND OPERATION OF THE INVENTION

Figure 1:
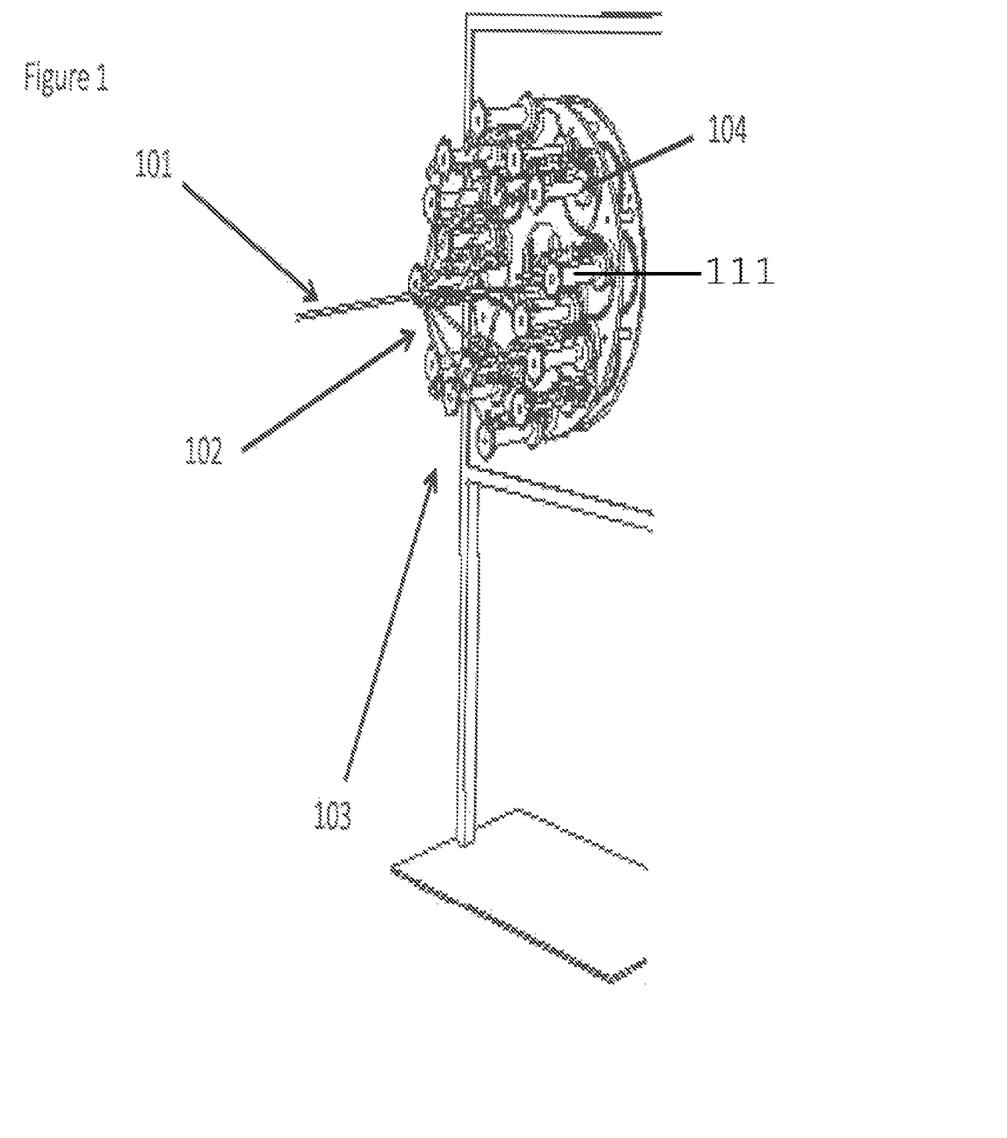
Figure 2:
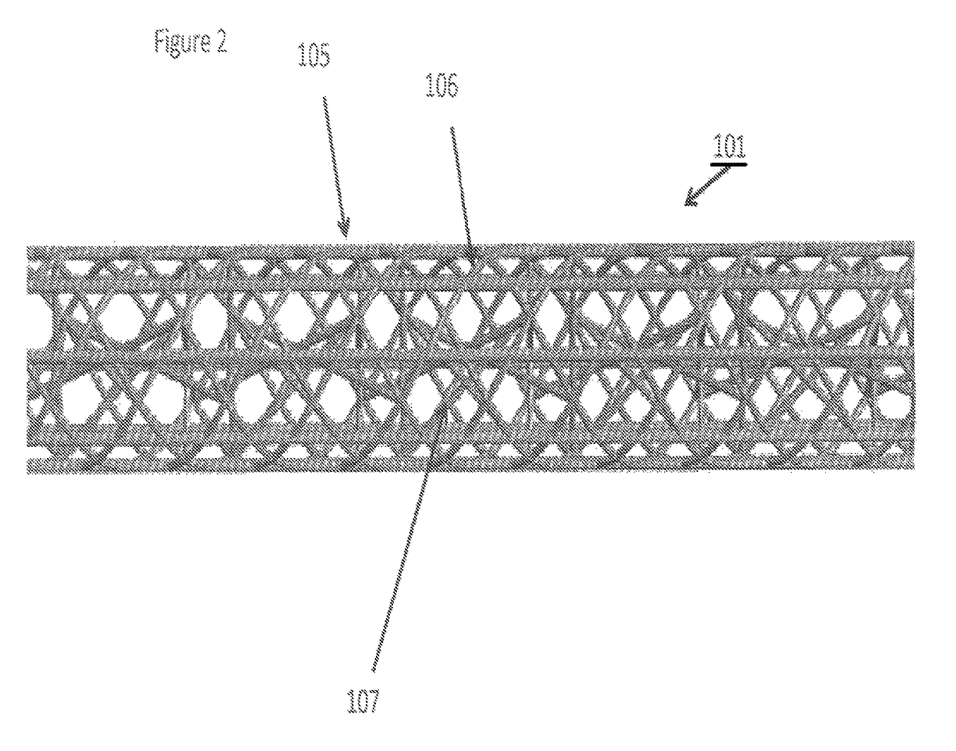
Figure 3:
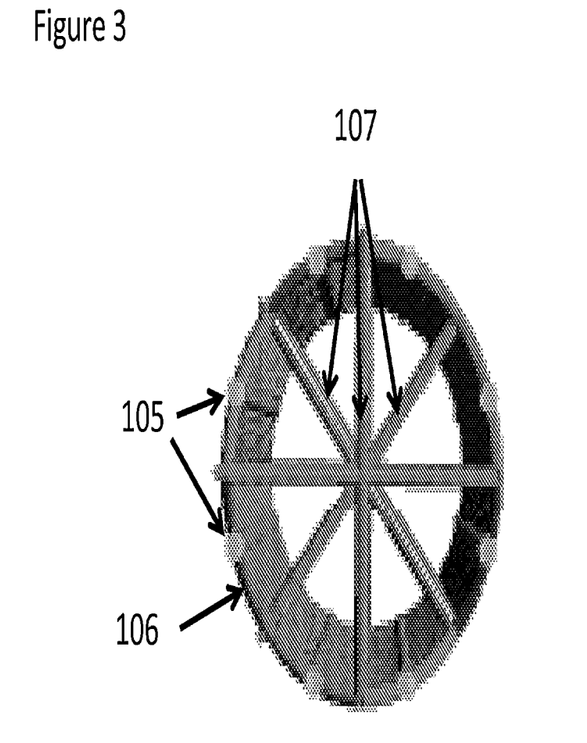
Figure 5:
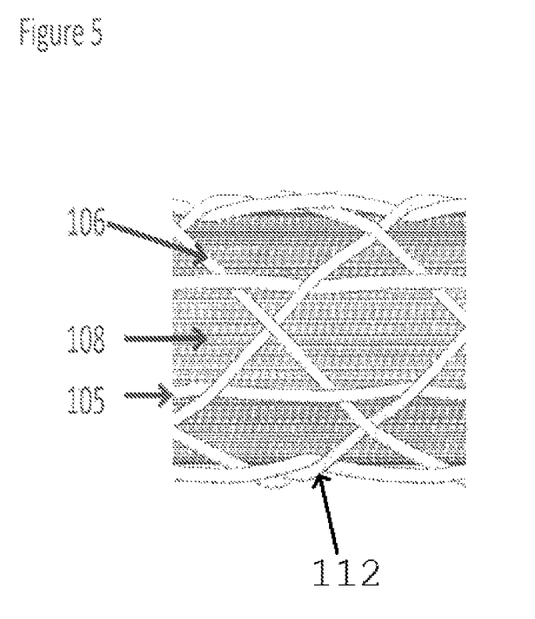

The structures of this invention are embodiments of open structure composite tubular members (101) produced on a maypole braiding machine (103) utilizing very large (i.e. high filament count) prepreg yarns (102) with filament (113) counts from 20,000 (20K) up to 100,000 (100 k) or more. Prepreg yarns (102) are jacketed by braiding, yarn wrapping or extrusion of thermoplastic sheath 110. FIG. 1 is a diagram of a typical maypole braiding machine (103), although it will be appreciated by one skilled in the art that such braiding machines are available in a variety of sizes—both physically and in the number of carriers (111) on the machine. Typical carrier (111) numbers on a machine range from 4 up to 1000. Bobbins (104) for carriers (111) range from 3 inches up to 3 feet and more. Tubular members (101) that can be made using this invention and method can be scaled up in size from the examples produced to illustrate this patent. Tubular members (101) in the following reduction to practice are all produced on a 32-carrier or 64-carrier Wardwell maypole horizontal braiding machine FIG. 2 shows a side view of an open structured tubular member (101) in cylindrical form defining a truss and having eight longitudinally extending and parallel oriented axial yarns (105) and eight helical braided yarns (106), four in each rotational direction. Tubular member (101) was braided on a cylindrical mandrel (108) as shown in FIG. 5 and after curing was removed prior to insertion of four "z" prepreg reinforcing yarns (107), also commonly referred as cross yarns, strut yarns, or through-the-thickness yarns, which were subsequently cured in place. FIG. 3 is a drawing of the cross section of open structured tubular member (101) in FIG. 2.

Figure 4:
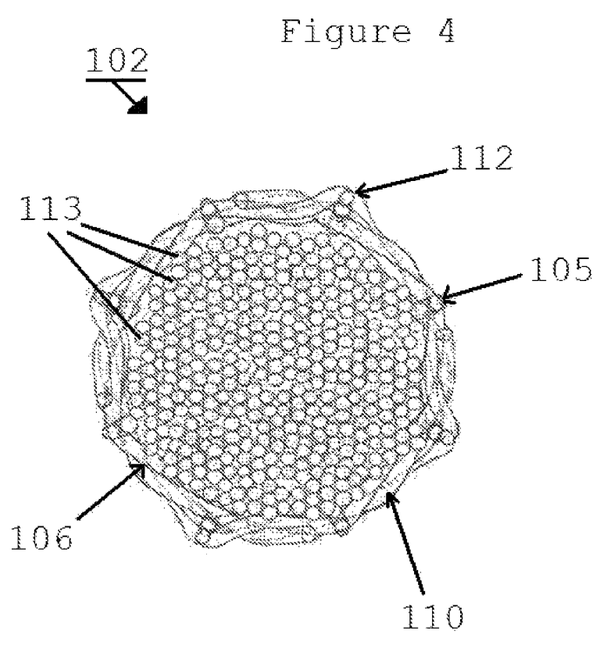

FIG. 4 is an elevated end view of jacketed yarn 102 exhibiting a true triaxial configuration, in which prepreg filaments 113 (also referred to as "tows" that define a yarn core) are hexagonally packed within jacketed sheath (110). FIG. 5 is an enlarged, elevated side view of an embodiment of jacketed yarn (102) defining a true triaxial configuration, which may be used for to form open structured tubular member (101). This orientation is identified by the interlacing of respective helical yarns (106) at a position "offset" or spaced from from their engagement with axial yarns (105). The "offset" engagement coupled with the over/under interlacing demonstrated in FIGS. 4 and 5 bestows jacketed yarn (102) and any resulting open structured member (101) with improved structural stability and crush-resistance relative to other braided members. In a braiding hierarchy, tows (113) are collected within jacketed sheath (110) and other yarns, for example axial yarns (105) and smaller helical yarns (106), may be braided therearound. Resulting jacketed prepreg yarn (102) may then be braided to form open structure member (101) is described in the examples below.

Figure 7:
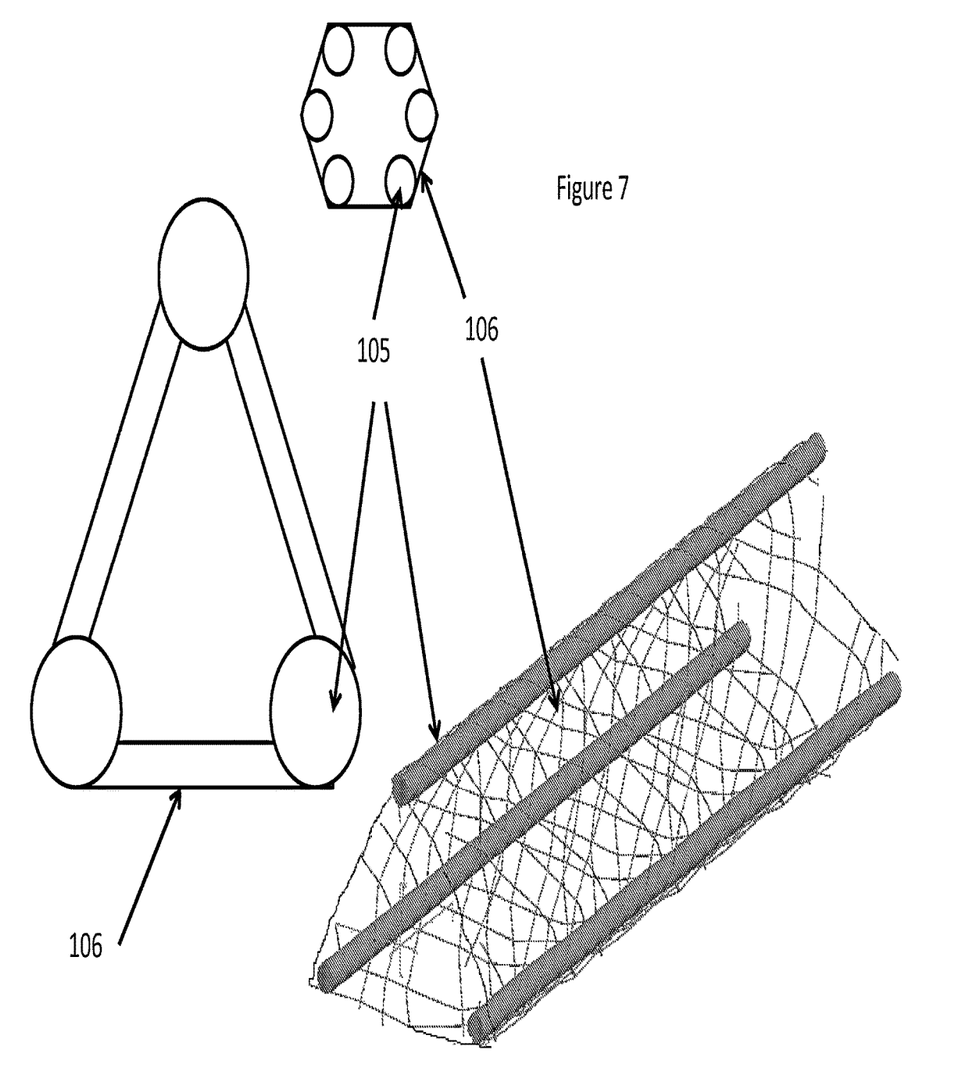
Figure 8:
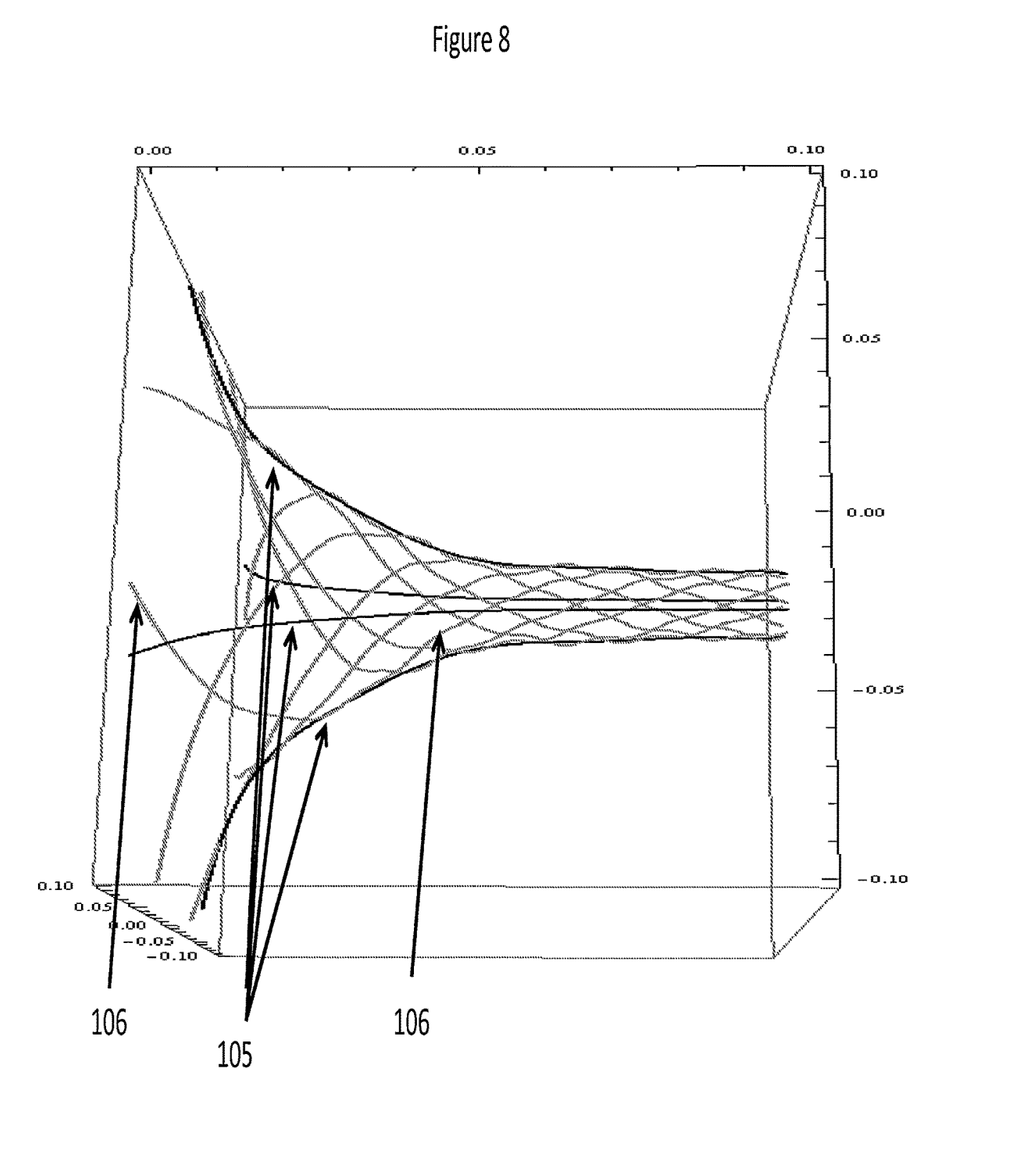

FIG. 8 shows a picture of the prepreg yarns (102) as they transition from the carrier (111) yarn packages to the braid consolidation point (fell point, not shown) of tubular member (101). One skilled in the art will immediately understand that the size and shape of the braid openings as well as the diameter of tubular member (101) are determined by the number of prepreg yarns (102), the speed of the braiding head, the speed of the take up, and the size of any mandrel (108) inserted into the center of the forming tubular member (101). It will also be understood that the mandrel (108) cross section can be any polygon shape (FIG. 7) or any convex curved elongate shape. The mandrel (108) may also vary in cross sectional size along its length.

Example 1

An embodiment of tubular open structured member (101) was made according to the teaching of this invention, but similar in size and weight per unit length to an energy drink can and similar in size and weight to a prepreg single-layer woven sleeve constructed of carbon fiber and epoxy resin. Open structure member (101) was made from a 36 k assembled prepreg carbon yarn (102) (from TCR Composites and formed from filaments 113 as illustrated in FIG. 4) with eight helical yarns (106) serving as the jacket. The jacket yarns were 200 denier Vectran™ yarns which were braided around the 32K prepreg tow (113) core. Jacket 110 itself is formed from eight helical yarns (106) and eight axial yarns (105) arranged in a true triaxial configuration. The composite open structured member (101) was made on a 32-carrier maypole braider (103) with four helical yarns (106) and four axial yarns (105) in the true triaxial structure (as shown in FIG. 5). In the true triaxial structure, the axial yarns (105) interlace with the helical yarns (106). Crossover joints (112) in open structure member (101), which are defined as positions where two or more yarns contact one another via braiding, were reinforced with additional epoxy resin. Both the aluminum can and the single-layered cured prepreg weave could be easily crushed by hand, but the cured open structure member (101) could not be crushed by hand, demonstrating the superior stiffness and strength of open structure member 101.

Example 2

Figure 6:
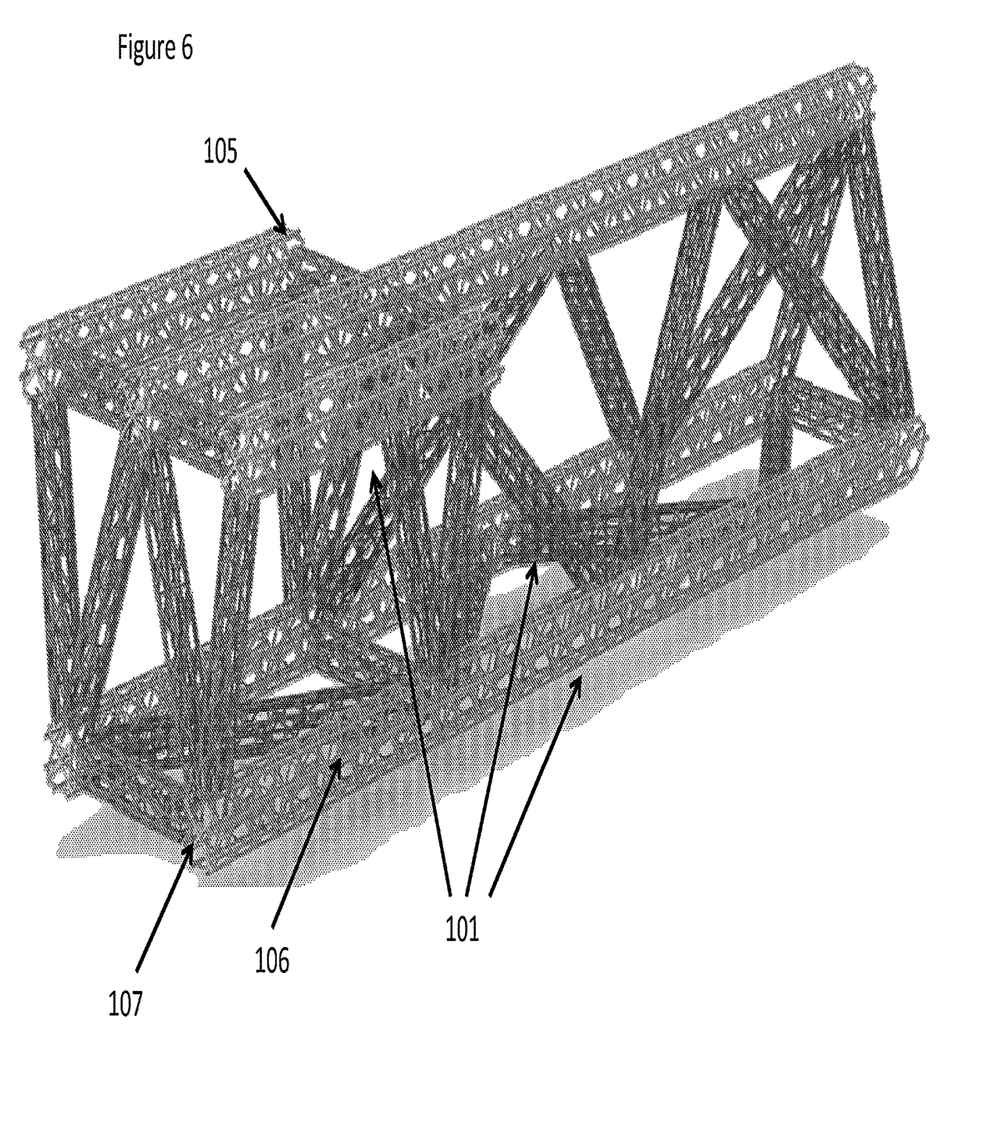

An embodiment of tubular open structured members (101) similar to that disclosed in Example 1 may be assembled into larger structures like that shown in FIG. 6. FIG. 6 is a drawing of a framework for a human powered vehicle for a student "moonbuggy" competition at NASA's Marshall Space Flight Center. The framework was constructed of cylindrical open structured members (101) defining a plurality of trusses produced in accordance with the teachings of this invention using the z direction reinforcement (107) yarn and crossover joints (112) shown in FIGS. 2 and 3.

Example 3

Figure 9:
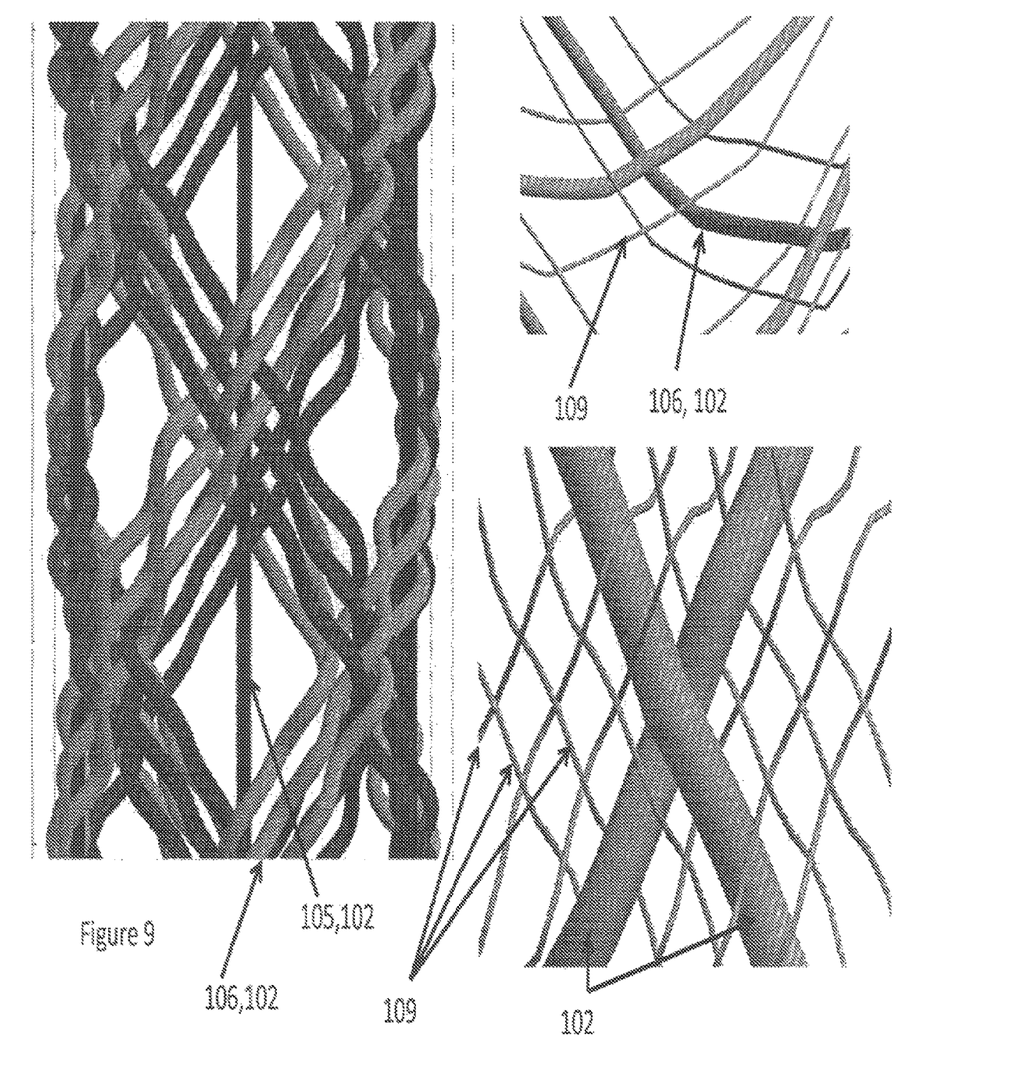

An embodiment of tubular open structure member (101) may be constructed using jacketed 36k carbon prepreg yarns (102)—namely, three axial (105) and eight helical (106) prepreg yarns—in a true triaxial configuration. A mandrel (108) of triangular cross section was used. Each helical prepreg yarn (106) was flanked by 2 Kevlar™ 1000 denier yarns (109). Open structure member (101) was cured on the mandrel (108) to set the shape and then the smaller Kevlar™ flanker yarns (109) for example shown in FIG. 9, and the crossover joints (112) were coated with resin before curing again. The Kevlar™ flanker yarns (109) were on either side of the cured prepreg yarns (102). The flanking yarns (109) helped to stabilize the crossover joints (112) between respective yarns (105) and (106). The geometry of open structure member (101) is shown in FIG. 9.

Example 4

An embodiment of tubular open structure member (101) may be constructed using 8 axial (105) and 8 helical (106) jacketed 36 k prepreg carbon tows on a maypole braiding machine (103) set up for true triaxial braiding. The mandrel (108) was a 1.5 inch diameter pipe with a 1.5 inch diameter sleeve of braided fiberglass covering the pipe. The open structured member (101) and sleeve were painted with liquid resin and then cured. The structure had significantly greater strength and stiffness than the same open structure member (101) without the added sleeve.

Example 5

An embodiment of tubular open structure member (101) of example 4 was taken before painting with resin and was covered with an non-prepreg embodiment of jacket (110), namely a 1.5 inch diameter braided fiberglass sleeve. The mandrel (108) with its 3 layers was vacuum bagged and vacuum infused with liquid epoxy resin before curing. The composite open structure member (101) was very strong and supported a 200 pound person standing and jumping on the side of the structure (101). In this configuration, as in Example 4, the lattice structure of open structure member (101) with a sleeve can be viewed as rib stiffened cylindrical structure which on larger scale might be useful as a pipe, tank or rocket motor.

Example 6

An embodiment of tubular open structure member (101) was constructed using jacketed prepreg carbon yarns (102) on a maypole braiding machine (103). The structure used four (4) 36 k axials (105) and sixteen (16) helicals (106) (eight (8) 36 k helicals and eight (8) 72 k helicals). The helical yarns (106) were arranged in two (2) sets of four (4) yarns each with the smaller (i.e. 36 k yarns) two in the center and the larger (i.e. 72 k yarns) two flanking either side. The prepreg yarns (102) were braided on a 2.5 inch diameter mandrel (108). The crossover joints 112 were strengthened and reinforced by painting with additional epoxy resin before curing. The product was used as a drive shaft by a student team in a formula style race car for intercollegiate competition. The axials (105) and helicals (106) were interlaced into a titanium gear to transmit the power. The structure had a 75% weight saving over the metal drive shaft it replaced.

REFERENCES

Manual of Steel Construction, 8th Edition, American Institute of Steel Construction, 1987 Hou, A., Gramoll, K., Compressive Strength of Composite Lattice Structures, Journal of Reinforced Plastics and Composites March 1998 17: 462-483

Hou, A., Gramoll, K., Fabrication and compressive strength of the composite attachment fitting for launch vehicles, J of Advanced Materials, 2000, vol. 32, not, pp. 39-45

Jensen, M. J., Jensen, D. W., Howcroft, A. D., Continuous Manufacturing of Cylindrical Composite Lattice Structures, TEXCOMP10 Recent Advances in Textile Composites, edited by Christophe Binetruy, François Boussu, 2010, p. 80-87

Mouritz A., Gellert, E., Burchill, P., Challis, K., Review of advanced composite structures for naval ships and submarines, Composite Structures, 2001

Zhang, Q., Beale, D., Adanur, S., Broughton, R. & Walker, R., Structural Analysis of a Two-dimensional Braided Fabric, Journal of The Textile Institute, Volume 88, Issue 1, 1997, pages 41-52

Wilson, Kipp and Ridges, U.S. Pat. No. 8,313,600: Method and system for forming composite geometric support structures, Nov. 12, 2012 http://www.geostrut.net/home/

U.S. PATENT DOCUMENTS

U.S. Pat. No. 3,551,237, December 1970, Cox et al.
U.S. Pat. No. 4,086,378, April 1978, Kam et al.
U.S. Pat. No. 4,137,354, January 1979, Mayes et al.
U.S. Pat. No. 4,278,485, July 1981, Hamm et al.
U.S. Pat. No. 4,366,658, January 1983, Maestre
U.S. Pat. No. 5,899,134, May 1999, Klein et. al.
U.S. Pat. No. 5,921,048, July 1999, Francom
U.S. Pat. No. 6,013,341, January 2000, Artjukhov.
U.S. Pat. No. 6,386,484, Hoyt et. al.
U.S. Pat. No. 7,132,027, November 2006, Jensen
patent applications 2009/0193961, 20050115186 and 20040247866.

A method of forming embodiments of open structure composites members (101) as described above is also provided and may include the steps of providing a plurality of resin pre-impregnated yarns (102) which preferably include a thermoplastic sheath or jacket (110) braided, wrapped, or extruded therearound. Each yarn (102) is formed from a core of resin pre-impregnated filaments (113), sometimes collectively referred to a "tow". In the preferred embodiment, at least twenty thousand (20,000) filaments (113) are axially aligned and combine to four one or more tows that are packed into jacket (110). The plurality of yarns (102) are then combined, for example by braiding on a maypole braiding machine (103) as described above, and cured so that the braided yarns (102) form an open structure composite member. In some embodiments, jackets (110) include resin pre-impregnated jackets, and these pre-impregnated jackets may themselves be fainted from tows pre-impregnated with resin. The jackets (110) may be formed from a material selected from the group consisting of aramids, polyethylene, nylon, polyester, polyolefin, and liquid crystal polymer.

The pre-impregnated nature of filaments (113), yarns (102), and jackets (110) may be quite advantageous, as the pre-impregnated resin may exude from one or more of filaments (113), yarns (102), and/or jackets (110) during or after the combination of yarns (102) as described above. Particularly in view of the number of filaments (113) at issue, to exude resin after the yarns have passed through the braiding machine is advantageous as to try and utility such yarns with surface-located resin would render the braiding operation practically non-functional. By mechanically interlocking the exterior surfaces, specifically adjacent portions of jackets (110), for example by allowing the resin to harden following a partial melting of the jacket surface, the resulting engagement or "crossover joint" (i.e. where one jacketed yarn (102) intersects or "crosses" another) is significantly more structurally reinforced than it otherwise would be. This similar mechanism may also be used with yarns (102) that do not include jackets (110), and instead exude resin directly from one yarn (102) to another. Additionally, or in the alternative, an open structure composite member (101) may include an additional, laterally-oriented yarn (102) to interlace with said open structure composite member (101) to define a new geometry or reinforce a particular feature of the existing geometry.

Additionally, or in the alternative, one or more open structure composite members (101) may further include an exterior sleeve formed therearound. Such a reinforcing sleeve may be pre-impregnated with resin, or it may be receptive of resin exuded from yarns (102). By infusing resin into the sleeve, for example by exuding the resin from yarns (102) which the sleeve surrounds, additional resin may be imparted on surfaces where the sleeve comes in contact with braided yarns (102), creating a further advantageous structure relative to the prior art.

What is claimed is:

1. An open structure composite member comprised of a plurality of jacketed yarns, each comprised of a plurality of tows pre-impregnated with resin and defining a core formed from at least twenty thousand (20,000) axially aligned filaments, the tows packed within a jacket, wherein the plurality of jacketed yarns are combined and cured to form an open structure composite member, and wherein the open structure composite member is formed at a rate of at least one meter per minute.

2. The composite member of claim 1 further comprising jackets formed from tows pre-impregnated with resin.

3. The composite member of claim 1 whereby the jackets are formed from a material selected from the group consisting of aramids, polyethylene, nylon, polyester, polyolefin, and liquid crystal polymer.

4. The composite member of claim 1 whereby the jackets are formed from one of braiding, yarn wrapping, or thermoplastic extrusion.

5. The composite member of claim 1 further comprising axially aligned filaments selected from the group consisting of carbon fiber, para-aramid, liquid crystal polymer, and glass.

6. The composite member of claim 1 comprising jacketed yarns defining a braiding architecture selected from the group consisting of diamond, twill, hercules, biaxial, triaxial, and true triaxial patterns.

7. An open structure composite member comprised of a plurality of jacketed yarns each comprised of a plurality of tows pre-impregnated with resin and defining a core formed from at least twenty thousand (20,000) axially aligned filaments, the tows hexagonally packed within a jacket, wherein the plurality of jacketed yarns are combined and cured to form an open structure composite member.

8. The composite member of claim 7 further comprising jackets formed from tows pre-impregnated with resin.

9. The composite member of claim 7 whereby the jackets are formed from a material selected from the group consisting of aramids, polyethylene, nylon, polyester, polyolefin, and liquid crystal polymer.

10. The composite member of claim 7 whereby the jackets are formed from one of braiding, yarn wrapping, or thermoplastic extrusion.

11. The composite member of claim 7 further comprising axially aligned filaments selected from the group consisting of carbon fiber, para-aramid, liquid crystal polymer, and glass.

12. The composite member of claim 7 comprising jacketed yarns defining a braiding architecture selected from the group consisting of diamond, twill, hercules, biaxial, triaxial, and true triaxial patterns.

13. A method of forming an open structure composite member comprising the steps of:
   providing a plurality of jacketed yarns each comprised of a plurality of tows pre-impregnated with resin and that define a core formed from at least twenty thousand (20,000) axially aligned filaments packed within a jacket;
   combining the plurality of jacketed yarns; and
   curing the combined jacketed yarns to form an open structure composite member.

14. The method of claim 13 wherein providing a plurality of jacketed yarns includes providing jackets formed from tows pre-impregnated with resin.

15. The method of claim 13 wherein providing a plurality of jacketed yarns includes providing jackets formed from a material selected from the group consisting of aramids, polyethylene, nylon, polyester, polyolefin, and liquid crystal polymer.

16. The method of claim 13 further comprising the step of interlacing the open structure composite member with a yarn, the yarn oriented laterally within said open structure composite member.

17. The method of claim 13 further comprising the steps of:
   exuding resin from the plurality of pre-impregnated tows;
   mechanically interlocking the plurality of tows; and
   bonding the plurality of tows that contact the resin at a crossover joint.

18. The method of claim 14 further comprising the steps of:
   exuding resin from the plurality of pre-impregnated jackets;
   mechanically interlocking the plurality of jackets; and
   bonding the plurality of jackets that contact the resin at a crossover joint.

19. The method of claim 15 further comprising the steps of:
   partially melting the jackets; and
   bonding the jackets at a crossover joint.

20. The method of claim 13 further comprising the steps of:
   reinforcing the open structure composite member with a plurality of braided sleeves;
   infusing resin into the plurality of sleeves;
   adding resin at a crossover joint; and
   curing the open structure composite member with a plurality of braided sleeves.

* * * * *